June 12, 1962 M. F. PETERS 3,038,553
FLEXIBLE FLUID COUPLING AND SOUND ATTENUATING ASSEMBLIES
Filed Aug. 26, 1960 3 Sheets-Sheet 1

INVENTOR.
Melville F. Peters
BY
ATTORNEY

June 12, 1962 M. F. PETERS 3,038,553
FLEXIBLE FLUID COUPLING AND SOUND ATTENUATING ASSEMBLIES
Filed Aug. 26, 1960 3 Sheets-Sheet 2
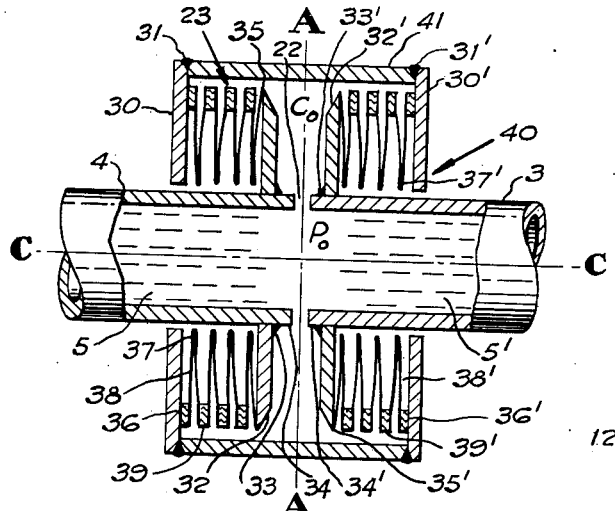
Fig. 3.
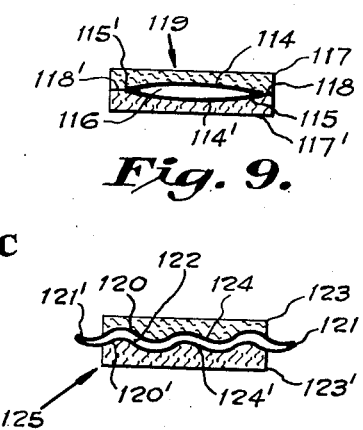
Fig. 9.
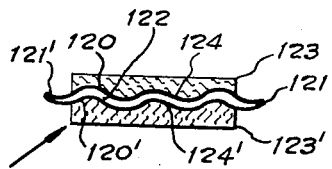
Fig. 10.
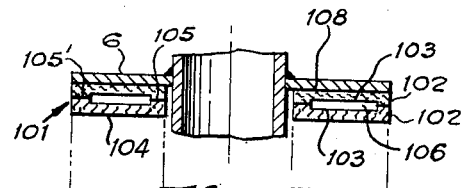
Fig. 7.
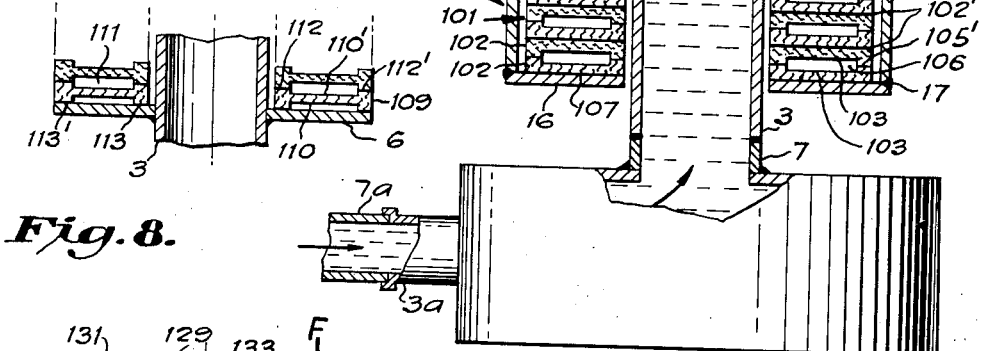
Fig. 8.
Fig. 6.
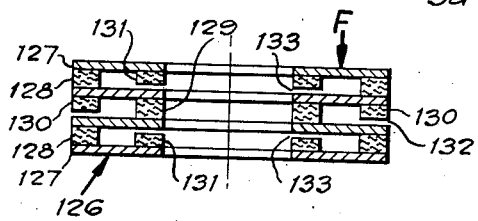
Fig. 11.
INVENTOR
Melville F. Peters
BY 
ATTORNEY June 12, 1962  M. F. PETERS  3,038,553
FLEXIBLE FLUID COUPLING AND SOUND ATTENUATING ASSEMBLIES
Filed Aug. 26, 1960  3 Sheets-Sheet 3

INVENTOR
Melville F. Peters
BY Albert F Kronman
ATTORNEY

United States Patent Office 3,038,553
Patented June 12, 1962

3,038,553
FLEXIBLE FLUID COUPLING AND SOUND
ATTENUATING ASSEMBLIES
Melville F. Peters, 29 N. Ridge Road, Livingston, N.J.
Filed Aug. 26, 1960, Ser. No. 52,239
20 Claims. (Cl. 181—59)

The present invention relates to flexible fluid bearing devices which may be placed between rigid conduits and in particular to fluid bearing devices which have sufficient flexibility and mechanical strength to support and accommodate both slow and cyclic changes in length and position of the attached rigid conduits while presenting a high acoustical impedance to both structural and fluid borne sounds. This application is a continuation-in-part of two applications for patents entitled: Fluid Line Sound Absorbing Structures, filed November 14, 1957, Serial No. 696,452, by Melville F. Peters, and Flexible Hose Structures, filed September 15, 1959, Serial No. 840,173, by Melville F. Peters.

It is common practice to isolate the vibrations generated by a pump from the fluid bearing conduits in a system by placing a piece of rubber hose between the inlets and outlets of the pump and the rigid conduits. The ends of the hose may be secured to the outlets of the pump and the conduit by hose clamps, or the ends may be bonded to suitable metal fittings and bolted or welded to the rigid conduits and pump outlets. This is a satisfactory arrangement for isolating the mechanical vibrations and sound generated by the pump from the conduits, but not a satisfactory arrangement for preventing these same disturbances from traveling from the pumping unit through the fluid into the system. To isolate these disturbances from the fluid in the system it is common practice to attach filters which are generally in the form of side tubes, side chambers, concentric cylinders and so on to the conduits attached to the inlet and outlet of the pump.

When rubber hose is used as the flexible assembly in systems operating at relatively high pressures or using large diameter conduits, it is necessary to provide a mechanical structure to prevent the end forces applied to the flexible element by the fluid in the conduits from separating the hose from its end fittings. These forces are equal to the cross sectional area of the conduit multiplied by the fluid pressure. If the hose is reinforced so that it is strong enough to resist the end forces without an additional supporting structure, the hose assembly will be too stiff to serve as an expansion joint and will lose its effectiveness in isolating the disturbances generated by the pump from the conduit.

When a plane sound wave traveling in a first fluid medium contacts the boundary of a second fluid medium, a portion of the energy will be transmitted into the second medium and a portion of the energy will be reflected back into the first medium. Whenever the wave front in the fluid impinges at right angles to the surface of a solid body, the portion of the energy transmitted into the solid body and the portion of the energy reflected from the contacting surfaces can be calculated as though the solid body were a fluid having a characteristic impedance of PC, where P is the density of the solid in grams/cm.³ and C is the velocity of sound in the medium in meters/second.

The sound transmission coefficient $a_t$ is independent of the direction of wave propagation. It is expressed by the equation, $$a_t = \frac{4r_{12}}{(r_{12}+1)^2} \tag{1}$$

and $$r_{12} = \frac{P_1 C_1}{P_2 C_2} \tag{2}$$

where, $P_1 C_1$ is the characteristic impedance of the first medium.
$P_2 C_2$ is the characteristic impedance of the second medium.

The ratio of the intensity of a sound wave passing in normal incidence from a steel plate into air can be computed by substituting the numerical values for $P_1 C_1$ and $P_2 C_2$ into Equations 1 and 2, providing the plate is so thick it cannot vibrate as a thin plate or membrane.

$$r_{12} = \frac{P_1 C_1}{P_2 C_2} = \frac{3.2 \times 10^6}{41.5} = 7710 \tag{3}$$

and $$a_t = \frac{4r_{12}}{(r_{12}+1)^2} = \frac{4 \times 7710}{(7710+1)^2} = 5.2 \times 10^{-4} \tag{4}$$

where, $P_1 C_1 \sim 41.5$ is the characteristic impedance of air.
$P_2 C_2 \sim 3.2 \times 10^6$ is the characteristic impedance of steel.

Since sound transmission is independent of the direction of wave propagation, an air gap placed between steel plates attached to the inlet and outlet of a flexible assembly will reduce the sound intensity by a factor of $1/(5.2 \times 10^{-4})(5.2 \times 10^{-4}) = 3.7 \times 10^6$.

At operating temperatures between $-70°$ and $350°$ F. it is advantageous to use an elastomer such as rubber or silicon resin in the structure of the flexible assembly, so that sound traveling through the assembly will be forced to travel through contacting surfaces consisting of metals and air, metals and elastomers, and elastomers and air. Since an elastomer is neither a liquid nor a solid, the exact value of the transmission coefficient of the sound wave passing from a first elastomer medium to a second elastomer medium in combination with an air barrier cannot be obtained by substituting the values for the characteristic impedance of the elastomer and air in Equations 1 and 2. Experimental values show that the transmission coefficient $a_t$ between rubber and steel is very small and it is well known that the transmission coefficient between rubber and air is even less than the transmission coefficient between rubber and steel.

Pumping systems have been constructed for use on ships comprising flexible assemblies consisting of rubber hose with end fittings to accommodate vibrations of the conduits, mechanical assemblies to prevent over stretching of the hose, expansion joints to correct for changes in length of the rigid conduits, side tubes, side chambers and so on placed at some distance from the flexible assembly to filter out the fluid borne sounds. Tests conducted upon these installations show that if the disturbances in the conduit are removed at one station by the rubber hose and the disturbances in the fluid removed at a second station by side chambers, that some of the energy in the fluid will be transferred from the fluid to the structure while the disturbance is traveling from the hose to the side chambers. These new disturbances in the structure will not be removed by the side chambers and unless other filtering elements are placed in the conduit, the disturbance will travel to all parts of the system. This means that to effectively remove or confine the disturbance to the approach side of the second station, it is necessary to remove the disturbance in the structure and the fluid at the same station or the same region of the conduit.

Recent measurements show that the velocity of sound in sea water increases with an increase in temperature and pressure. Over a temperature range extending from −3° C. to 30.9° C. and zero pressure, the velocity will increase from 1435 meters/second to 1548 meters/second and over a pressure range extending from 0 to 990 kilograms/centimeter$^2$ and 0° C. temperature, the velocity will increase from 1449 meters/second to 1618 meters/second.

The frequency at which resonance takes place in a confined fluid is proportional to $C/\sqrt{V}$, where C and V are the velocity and volume respectively of the confined fluid. To provide a filter which will not become un-tuned with changes in the temperature and pressure of the fluid, it is necessary to add to the assembly a unit which will change the volume of the confined fluid with changes in the velocity of the sound wave so as to satisfy the relation $C/\sqrt{V}$.

The present invention overcomes the necessity for using a multiplicity of separate units distributed along the conduit to attenuate disturbances initiated in one part of the fluid system before the disturbances arrive in another part of the system by providing a unit consisting of elements which are composed of materials having different characteristic impedances. These elements are arranged so that the disturbances in the conduit and in the fluid are removed from both the conduit and fluid at the same instant from the same region of the assembly.

Accordingly, it is an object of the present invention to provide a flexible fluid bearing assembly to attenuate mechanical and acoustical disturbances initiated in a first part of a fluid system before the disturbance travels to a second part of the fluid system.

It is another object of the present invention to provide a flexible fluid bearing assembly which does not require an additional supporting structure to prevent the flexible element from failing when subjected to high pressures.

It is still another object of the present invention to provide a flexible fluid bearing assembly which can be tuned to filter specified wave bands from the sound spectrum in the system.

Another object of the present invention is to provide a control unit to keep the assembly tuned to the predominating noise band when the predominating band is shifted in the sound spectrum by changes in temperature and pressure of the fluid in the system.

It is a feature of the present invention to provide flexible fluid bearing assemblies with units composed of material having different characteristic impedances.

It is another feature of the present invention to provide flexible units in the assembly which consist of layers of metals and elastomers.

A feature of the present invention is to provide flexible units in the assembly which consists of layers of elastomers, metal and air gaps.

Another feature of the invention is to provide a flexible assembly with elements which require disturbances entering the assembly to travel through alternate layers of solids and fluids before reaching the outlet conduit.

It is a feature of the invention to control the band of wave lengths removed from the second spectrum by controlling the pressure differential across the flexible fluid element in the assembly.

Still another feature of the invention is to provide a flexible high impedance acoustical assembly which consists of a series of contacting surfaces formed between material having different characteristic impedances.

It is a feature of the present invention to use a plurality of layers of elastomers with a thickness of 0.006 inch or less bonded to metal or plastic washers.

It is a further feature of the present invention to change the distance between the elements of the flexible assembly by changing the pressure differential across the assembly.

It is another feature of the present invention to change the relative length of the units in the flexible assembly by changing the pressure differential across the flexible assembly.

Another feature of the present invention is its control unit which tunes the flexible assembly to the predominating noise or wave band when the predominating wave band is shifted by changes in temperature and pressure in the system by changing the pressure differential across the flexible assembly.

The exact nature of the present invention as well as other objects and advantages thereof will be readily apparent from consideration of the following detailed description related to the annexed drawings, in which similar parts are designated by the same numbers and like parts symmetrical about a dividing plane are designated by numbers on the left side of the plane and the prime of the same numbers on the right side of the plane.

FIGURE 3 is a somewhat diagrammatic view in side elevation partly broken away of a flexible assembly consisting of two units similar to the single unit shown in FIGURE 2, made in accordance with the present invention.

FIGURE 6 is a somewhat diagrammatic view in side elevation partly broken away of a flexible assembly similar to the assembly in FIGURE 1 having flexible elements with air gaps, made in accordance with the present invention.

FIGURE 7 is a cross-sectional view of one flexible element or cell of the cells shown in FIGURE 6, made in accordance with the present invention.

FIGURE 8 is a cross-sectional view of a cell which will create an air gap on each of its surfaces when assembled into a flexible element, made in accordance with the present invention.

FIGURES 9 and 10 are cross-sectional views of a flexible element or cell consisting of elastomers, metal washers and an air gap made in accordance with the present invention.

FIGURE 11 is a diagrammatic cross-sectional view of a flexible unit which uses the liquid in the system to increase the flexibility and to introduce a viscous-friction force into the flexible assembly, made in accordance with the present invention.

Figure 1:
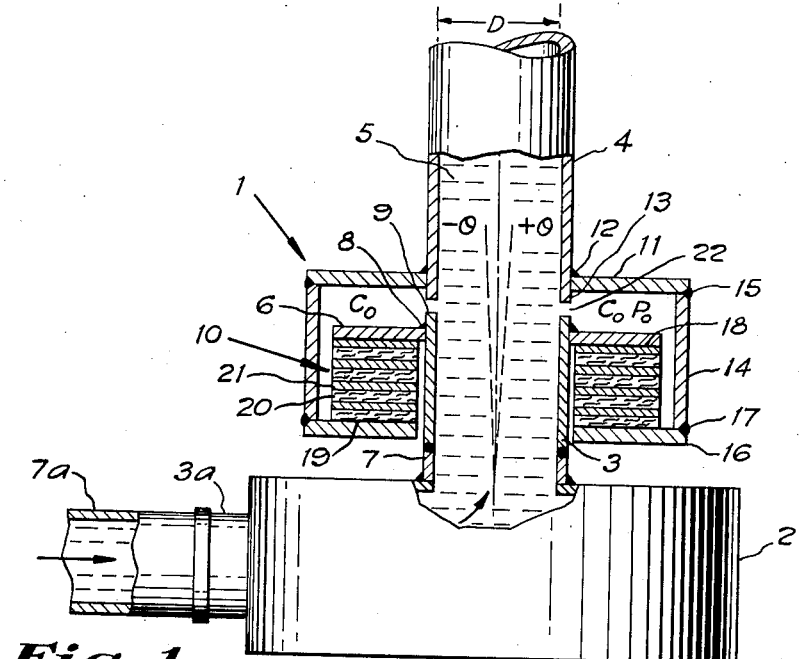
FIGURE 1 is a view in side elevation partly broken away of a flexible assembly placed between the outlet of a pump and a fluid bearing conduit made in accordance with the present invention.

Referring to the drawings and particularly to FIGURE 1, a flexible assembly is placed between conduits 3 and 4 so that the vibrations and noise initiated in conduit 3 and fluid 5 by pump 2, will be reduced in intensity before these disturbances arrive at conduit 4. Conduit 3 of the flexible assembly 1 has one end attached to the pump outlet 7 and the other end secured to a shoulder 6 at 8, so that a portion 9 of the conduit protrudes beyond the shoulder. The conduit 4 has one end attached to shoulder 11 at 12 so that a portion 13 of the conduit protrudes beyond the shoulder. The cylindrical element 14 has one end secured to shoulder 11 at 15 and the other end secured to a centrally bored end wall 16 at 17. A flexible element 10 is secured between shoulder 6 and end wall 16 at 18 and 19 respectively. The flexible element 10 consists of a number of metal or plastic washer shaped discs sandwiched between and bonded to elastomer washers 20. The outside diameter of the elastomer washers 20 can be equal to, less than, or greater than the diameter of the metal discs 21.

Conduit 7a is attached to inlet 3a of pump 2. Fluid passes through the assembly as indicated by the arrows.

Where the operating pressure $P_0$ is low or the diameter D of the pipe is small enough so that the compressive force $F=P_0(\pi D^2/4)$ acting on the elastomer washers does not produce a pressure great enough to cause the elastomer to flow, the elastomer washers can be made thick enough to give the assembly the required flexibility. Where the force F acting on the elastomer washers produces a pressure above the extrusion pressure of the elastomer, the elastomer washers should have a thickness less than five or six thousandths of an inch. If the amplitude of the shaking forces as well as the force F is great, a large plurality of metal and elastomer washers will be required to give the assembly the required flexibility.

Disturbances initiated in conduit 3 must follow a path through shoulder 6, the flexible assembly 10, end walls 16, the cylindrical element 14 and shoulder 11 to reach conduit 4. Reflection of sound will take place at each bonded surface since the material of the elastomer washers 20 is selected so that its characteristic impedance $P_1C_1$ is different from the characteristic impedance $P_2C_2$ of the metal washers 21.

The disturbance in fluid 5 within the system will be attenuated by chamber $C_0$ acting as a Helmholtz resonator and the slit 22 between the conduits 3 and 4 as the slit leading into the chamber $C_0$. The exact volume of this chamber and size of slit opening needed to remove the particular band of frequencies generated by pump 2, must be determined experimentally.

Shaking forces initiated by the pump 2 will be attenuated between conduits 3 and 4 by the flexible element 10, while allowing the conduits to rock through a small axial displacement $\pm \theta$.

The flexible assembly 1 is self supporting, since the flexible element 10 is always subjected to compressive forces by the fluid 5 within the system.

Figure 2:
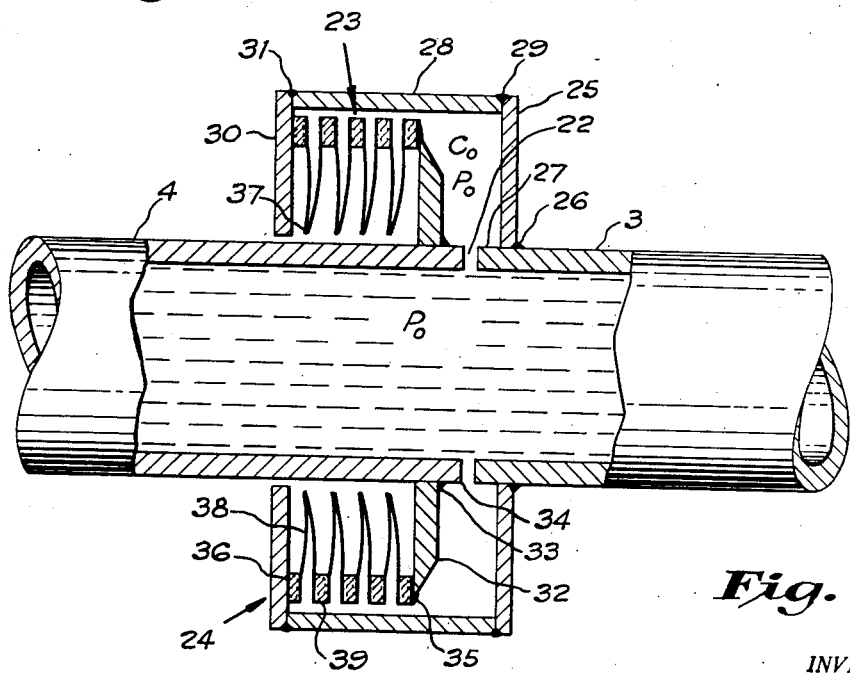
FIGURE 2 is a somewhat diagrammatic view in side elevation partly broken away of a flexible assembly having a flexible element consisting of elastomer and metal washers, made in accordance with the present invention.

FIGURE 2 shows a flexible assembly 24 placed between conduits 3 and 4 which are anchored at one end to allow the conduits to expand and shift position while attenuating the vibrations and sound in both the structure and the fluid. The rigid parts of the assembly 24 consist of a shoulder 25 attached to conduit 3 at 26 so that a portion of conduit 3 protrudes at 27. A cylindrical element 28 having one end secured to shoulder 25 at 29 has its other end secured to disc 30 at 31. A flange 32 is attached to conduit 4 at 33 so that a portion of conduit 4 protrudes at 34.

The flexible seal 23 has its ends secured between flange 32 and disc 30 at 35, 36, respectively. The flexible element which will be referred to as a bellmets consists of washer-shaped plates 38 welded together on their inner peripheries at 37 and bonded together by a ring-like elastomer 39 over an appreciable area near their outer peripheries, so that when the pressure is applied to the outer surface of the bellmets, the elastomer will always be subjected to compressive forces. Tests conducted upon bellmets show that the opposite ends of a bellmets one inch long can be rotated through an angle of $\pm 35$ degrees while stroked through a displacement of ¼ inch with ambient temperature as low as $-70°$ F. and as high as $350°$ F., 50,000 times without failure.

The flexible assembly 40 in FIGURE 3 consists of two flexible assemblies similar to the assembly in FIGURE 2, and is symmetrical about a plane AA normal to the CC axis. The two flexible assemblies are joined together by the cylindrical element 41 which has one end attached to washer 30 at 31 and the other end attached to washer 30' at 31'.

The attenuation of the disturbances by the assemblies in FIGURES 2 and 3 can be obtained by following the description given for the attenuation of the disturbances by the assembly in FIGURE 1.

Figure 4:
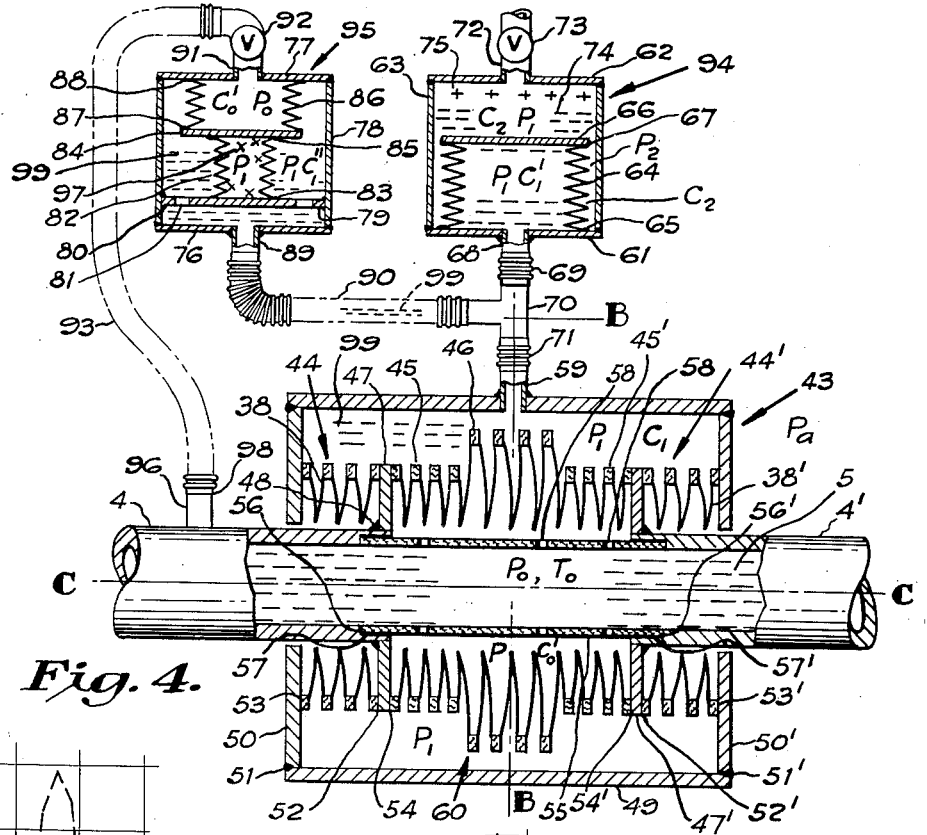
FIGURE 4 is a somewhat diagrammatic view in side elevation partly broken away of a flexible assembly with a control unit, made in accordance with the present invention.

The flexible assembly 43 in FIGURE 4 is symmetrical about a plane BB normal to the CC axis. Referring to the portion of the assembly on the left side of plane BB, conduit 4 has one end secured to a shoulder 47 at 48 and the other end is attached to the pump or some other vibrating unit (not shown). A cylindrical element 49 has its ends secured to washers 50 and 50' at 51 and 51' respectively. A bellmets 44 having the same construction as bellmets 23 in FIGURE 2 has one end bonded to shoulder 47 at 52 and the other end bonded to disc 50 at 53. A flexible assembly 60 symmetrical with respect to plane BB consisting of bellmets 45, 46, 45' has one end attached to shoulder 47 at 54 and the other end attached to shoulder 47' at 54'. At least one of the three bellmets 45, 46, 45' should be either larger or smaller than the other two, so that a change in the pressure $P_0$ in the conduit 4, or a change in the pressure $P_1$ in chamber $C_1$ will change the length of each one of the three bellmets.

An elastomer tube 55 having the same characteristic impedance as fluid 5 is attached in a slightly stretched condition to the counter-bore 56 in conduit 4 at 57 and to counter-bore 56' in conduit 4' at 57'. Holes 58 in the elastomer tube 55 equalize the pressure on both sides of the tube. An outlet 59 in the cylindrical element 49 allows fluids at a pressure $P_1$ to be introduced into chamber $C_1$.

One path by means of which the disturbances initiated in conduit 4 can reach conduit 4' through the structure is through shoulder 47, bellmets 44, washer 50, cylindrical element 49, washer 50', bellmets 44', shoulder 47' to conduit 4'. A parallel path from conduit 4, to 4' through the structure is through shoulder 47, bellmets 45, 46, 45' to shoulder 47'. Either one of these paths require the sound to pass through a series of interfaces formed of materials having different characteristic impedances.

Sound passing from conduit 4 to conduit 4' through fluid 5 is attenuated by bellmets 45, 46, 45', acting as stacks of metal washers separated by elastomer shims. The wave bands which are removed from the sound spectrum are determined by the size and spacing of the plates of the bellmets and the reduction in sound of the wave bands will be a function of the length of the three bellmets 45, 46, 45'. Both the spacing between pairs of plates and the relative lengths of the three bellmets can be changed by changing the pressure differential $(P_1-P_0)$ across the three bellmets.

When the assembly is operating at a constant pressure $P_0$ and temperature $T_0$ the pressure $P_1$ can be adjusted so that the spacing between the inner peripheries of the metal washer of bellmets 45, 46, 45' will give the maximum attenuation of the noises passing through the assembly and the unit will continue to give the maximum attenuation without further adjustment. Whenever the operating pressure $P_0$ or temperature $T_0$ or both changes, the pressure $P_1$ must be adjusted until the spaces between the inner peripheries of the metal washer of said bellmets will give the maximum attenuation of the noises passing through the assembly under the new conditions of temperature and pressure. The adjustments can be made manually, or automatically with the pressure regulator 94 and the temperature regulator 95.

The pressure regulating device 94 is enclosed in a housing formed by welding end plates 61, 62 to the cylindrical element 63. Bellows 64 has one end secured to plate 61 at 65 and the other end secured to cap 66 at 67. End plate 61 has an outlet 68. Conduit 69 has one end connected to outlet 68 and the other end connected to a T 70. Conduit 71 has one end connected to T 70 and the other end to outlet 59 of the cylindrical element 49. The upper end plate 62 has an outlet 72 with a shut-off valve 73, through which liquid 74 and gas 75 can be introduced into the chamber $C_2$ of assembly 94.

The pressure differential across bellmets 44 and 44' is equal to $P_0 - P_a$, where $P_a$ is the ambient pressure and is equal to approximately 14.7 p.s.i. When $P_0$, the pressure within the line, is very large the two bellmets 44, 44' may have to be replaced by the stronger flexible assembly 10 shown in FIGURE 1. The pressure differential across bellows assembly 60 is $P_1 - P_0$ and it may be plus or minus. It is small because it is independent of the absolute pressure $P_0$ and consequently the plates 38, 38' of bellmets 45, 46, 45' can be made from very thin material.

The temperature regulating device 95 is enclosed in a housing formed by welding end plates 76, 77, to the cylindrical element 78. A supporting plate 79 is secured to the inner surface of the cylindrical element 78 at 80. A multiplicity of holes or openings 81 in the plate allow the liquid 99 to circulate freely on both sides of the plate. A bellows 82 has one end attached to the supporting plate 79 at 83 and the other end attached to a cap 84 at 85. Bellows 82 is completely filled with a fluid 97. The fluid should have a relatively large coefficient of thermal expansion. A second bellows 86 has one end attached to a cap 84 at 87 and the other end attached to end plate 77 at 88. End plate 76 has an outlet 89. Conduit 90 has one end connected to outlet 89 and the other end to the third outlet of the T 70. End plate 77 has an outlet 91. Valve 92 has its end secured to outlet 91 and conduit 93. Conduit 4 has an outlet 96 which is connected to conduit 93 by means of coupling 98.

Neglecting the spring constants of the bellows the pressure differential across bellows 64 is zero, since the pressure of fluid 99 in chambers $C_1'$ and $C_2$ must be $P_1$. The pressure in chamber $C_0'$ in the temperature regulator 95 and conduit 4 is $P_0$. The pressure differential across bellows 86 is $P_1 - P_0$ and it may be plus or minus. It is relatively small since it is independent of the absolute pressure $P_0$. The pressure differential across bellows 82 is zero, because liquid 97 supports the inner walls of the bellows. Since the pressure differentials across all the flexible elements in the two regulating assemblies 94 and 95 are small, the metal plates in the three bellows 64, 82 and 86 can be made from thin material.

When the operating pressure $P_0$ is increased, the large bellows 46 in assembly 43 expands and compresses the two smaller bellmets 45, 45'. This decreases the volume of chamber $C_1$ and increases the pressure $P_1$. This increase in pressure causes bellows 64 in assembly 94 to expand without an appreciable increase in volume of chamber $C_1''$ in assembly 95.

The volume of the liquid 97 in bellows 82 in assembly 95 will increase when its temperature is increased by an increase in the operating temperature $T_0$ without an appreciable increase in the volume $C_1'$ in assembly 94, providing valve 92 in assembly 95 is open. This increase in the volume of the liquid 97 will elongate bellows 82 and compress bellows 86. Since the piston area of bellows 86 is greater than the piston area of bellows 82, the volume of chamber $C_1''$ will be increased with the elongation of bellows 82 and the compression of bellows 86.

In practice it will be preferred to supply bellows 82 with a heat exchanger or immerse it in fluid 5, so that the response time of the control unit will be small.

If a decrease in the volume of chamber $C_1''$ of assembly 95 is required when the temperature increases, the assembly 95 can be modified by removing bellows 82 together with fluid 97, filling chamber $C_0'$ with a fluid and sealing the chamber by closing valve 92.

Figure 5:
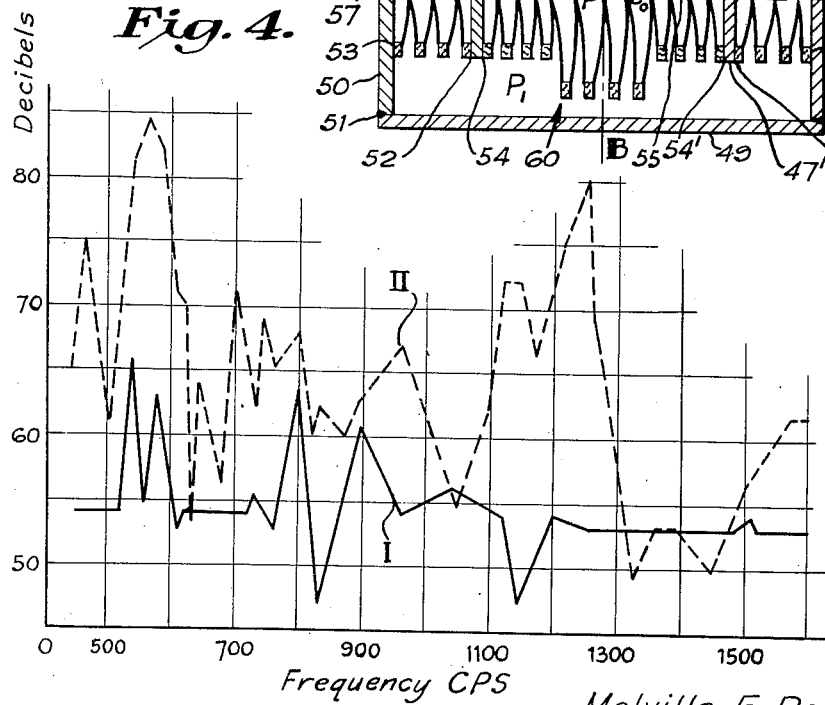
FIGURE 5 is a plot of the values obtained when sound measurements were made in a 2 inch pipe line with and without a flexible assembly having the same arrangement of flexible elements as the flexible assembly in FIGURE 4.

Curve I in FIGURE 5 is a plot of the values obtained by measuring the noise in a 2 inch pipe filled with water. Sound waves are introduced into one end of the pipe by an electrically driven piston and the measurements made in a large tank of water connected to the other end of the pipe. Curve II is a plot of the values obtained from the same arrangement of pipe and water tank with a flexible assembly similar to the assembly 43 in FIGURE 4 placed between the two ends of the pipe. In the test for which the values are given the flexible element 44, 45, 46, 45', 44 were metal bellows. Metal bellows do not offer as high an impedance to sound disturbances as bellmets.

Assembly 100 in FIGURE 6 is similar to the flexible assembly in FIGURE 1 except for the flexible element 101, a portion of which is shown in FIGURE 7. Element 101 consists of one or more cells. Each cell consists of two elastomer washers 102. Each washer has one surface 103 with the central portion scooped out and one flat surface 104. The washers are bonded together at the areas 105, 105' near their adjacent inner and outer peripheries to form the air pocket or sealed chamber 106. The cells are connected in series by bonding their flat surfaces together at 102' and the ends of the series of cells are secured to washer 16 at 107 and to shoulder 6 at 108.

Chambers 106 are filled with a fluid, preferably a gas or vapor, so that regardless of the pressure $P_0$ exerted on the outer walls 104 of the cell, the compressed fluid in the cell will prevent the elastomer surfaces 103 making contact. When the fluid is air, the cell consists of two elastomer washers separated by an air gap.

Each cell 109 in FIGURE 8 has two scooped out surfaces 110, 110' therein to form washers having an "I" shaped cross-section. These washers are bonded together at the flat areas 112, 112' near their inner and outer peripheries to form the sealed chambers 111. The assembly is completed by bonding the flat area of one end of the stack of cells to shoulder 6 at 113, 113' and the flat area of the other end of the stack of cells to shoulder 6 in the same manner as cell assembly 101 is bonded to shoulder 6 at 108 in FIGURE 6.

In FIGURE 9 each cell in the assembly will consist of two metal washers 114, 114' welded together at their inner and outer peripheries 115, 115' respectively to form the fluid tight chamber 116. Secured to the two metal washers are elastomer washers 117, 117'. The elastomer washers are bonded together at their inner and outer peripheries 118, 118' respectively to form the cell. Two or more cells can be bonded together to form an assembly and the ends of the assembly can be bonded to shoulder 6 of washer 16 the flexible assembly 100 shown in FIGURE 6.

FIGURE 10 shows a cell 125 which is a modification of cell 119 shown in FIGURE 9. Each cell has two heavy metal washers 120, 120' welded together at their outer and inner peripheries 121, 121' respectively to form the fluid tight chamber 122 which is filled was a gas. The metal washers 120, 120' are secured to the two elastomer washers 123, 123' at surfaces 124, 124' respectively. Areas near the inner and outer peripheries of the plates protrude beyond the elastomer washers. This structure has the advantage over the assembly shown in FIGURE 9 that gases may be introduced into the air or gas space 122 after the cell has been assembled.

FIGURE 11 shows a flexible element 126 which can be substituted for any one of the flexible elements in the structure shown in FIGURES 1 to 4 inclusive. The flexible element is formed by bonding elastomer washers 128 to the areas near the outer peripheries of pairs of metal or plastic washers 127 to form convolutions. These convolutions are held together by bonding elastomer washers 129 to the areas near the inner peripheries of the metal washers 127 to form a flexible fluid tight assembly. Between each convolution one surface of an elastomer washer 130 is bonded to the area near the outer periphery of one of the metal washers 127 and the other surface of the elastomer is free to separate, touch, or rub the surface of the adjacent metal washer. Between the washers 127 of adjacent convolutions an elastomer washer 131 is bonded to the area near the inner periphery of one of the metal washers 127 and the other surface of the washer is free to separate, touch, or rub the surface of the adjacent metal washer.

When the forces F are small, fluid gaps 132 will exist at the outer diameters of the flexible assembly between elastomer washer 130 and the adjacent metal washers 127 and at the inner diameter of the assembly fluid gaps 133 will exist between elastomer washers 131 and the adjacent metal washers 127. When the compressive forces F are great the gaps will be closed and the flexible assembly will be supported at their outer edges by washers 127, 128, 127, 130, 127, 128 and so on and at their inner edges by washers 127, 131, 127, 129, 127, 131, 127 and so on. Leaving alternate elastomer washers unbonded near the outer and inner areas increases the flexibility of the assembly.

Fluid trapped between the elastomer and metal washers will be forced to change position when the flexible assembly is subjected to shaking forces. Since all fluids are viscous, the movement of the trapped viscous fluid will dissipate energy. This dissipation of energy will limit the amplitude of the vibrating flexible assembly.

Having thus fully described the invention what is claimed as new and desired to be secured by Letters Patent of the United States, is:

1. A fluid line sound and vibration absorbing device for interconnecting rigid conduits comprising a first conduit, a second conduit spaced from said first conduit, a first outwardly disposed shoulder member secured to the first conduit, a second outwardly disposed shoulder secured to the second conduit, a cylindrical element overlying said shoulders and disposed around the conduits, at least one centrally bored end wall secured to the cylindrical element spaced from and disposed around one of the conduits and a fluid tight flexible element formed of a plurality of washer shaped elements of materials having alternately different characteristic impedances secured between at least one of the shoulders and an end wall.

2. A fluid line sound and vibration absorbing device for interconnecting rigid conduits comprising a first conduit, a second conduit spaced from said first conduit, a first outwardly disposed shoulder member secured to the first conduit, a second outwardly disposed shoulder secured to the second conduit, a cylindrical element overlying said shoulders and disposed around the conduits, at least one centrally bored end wall secured to the cylindrical element and disposed around one of the conduits, a first fluid tight element formed of a plurality of washer shaped elements of materials having alternately different characteristic impedances secured between the first and second shoulders and a second fluid tight flexible element formed of a plurality of washer shaped elements of materials having alternately different characteristic impedances secured between at least one of the shoulders and an end wall.

3. A fluid line sound and vibration absorbing device for interconnecting rigid conduits comprising a first conduit, a second conduit spaced from said first conduit, a first outwardly disposed shoulder member secured to the first conduit, a second outwardly disposed shoulder secured to the second conduit, a cylindrical element overlying said shoulders and disposed around the conduits, at least one centrally bored end wall secured to the cylindrical element and disposed around one of the conduits, a first fluid tight flexible element formed of a plurality of washer shaped elements of different outside diameters of materials having alternately different characteristic impedances secured between the first and second shoulders and a second fluid tight flexible element formed of a plurality of washer shaped elements of materials having alternately different characteristic impedances secured between at least one of the shoulders and an end wall.

4. A fluid line sound and vibration absorbing device for interconnecting rigid conduits comprising a first conduit, a second conduit spaced from said first conduit, a first outwardly disposed shoulder member secured to the first conduit, a second outwardly disposed shoulder secured to the second conduit, a cylindrical element overlying said shoulders and disposed around the conduits, at least one centrally bored end wall secured to the cylindrical element and disposed around one the conduits, a first fluid tight element formed of a plurality of washer shaped elements of materials having alternately different characteristic impedances secured between the first and second shoulders, an elastomer tube connected at each end to the first and second conduit respectively to form a fluid path therebetween and a second fluid tight flexible element formed of a plurality of washer shaped elements of materials having alternately different characteristic impedances secured between at least one of the shoulders and an end wall.

5. A fluid line sound and vibration absorbing device for interconnecting rigid conduits comprising a first conduit, a second conduit spaced from said first conduit, a first outwardly disposed shoulder member secured to the first conduit, a second outwardly disposed shoulder secured to the second conduit, a cylindrical element overlying said shoulders and disposed around the conduits, at least one centrally bored end wall secured to the cylindrical element and disposed around one of the conduits, a first fluid tight element formed of a plurality of washer shaped elements of materials having alternately different characteristic impedances secured between the first and second shoulders, an elastomer tube connected at each end to the first and second conduit respectively to form a fluid path therebetween, said tube having a plurality of small holes therein whereby fluid within the conduits can enter the chambers between the shoulders and the first flexible element and a second fluid tight flexible element formed of a plurality of washer shaped elements of materials having alternately different characteristic impedances secured between at least one of the shoulders and an end wall.

6. A fluid line sound and vibration absorbing device for interconnecting rigid conduits comprising a first conduit, a second conduit spaced from said first conduit, a first outwardly disposed shoulder member secured to the first conduit, a second outwardly disposed shoulder secured to the second conduit, a cylindrical element secured at one end to the second shoulder around the conduits and overlying the first shoulder, a centrally bored end wall secured to the free end of the cylindrical element and disposed around the first conduit and a fluid tight flexible element formed of a plurality of washer shaped elements of materials having alternately different characteristic impedances secured at one end to the first shoulder and at its other end to the end wall, disposed about the first conduit and spaced from the cylindrical element and second shoulder to provide, with said first and second shoulder end wall and cylindrical member, a resonant chamber between the two conduits.

7. A device according to claim 6 in which the flexible element comprises a series of metal discs and elastomer discs alternately arranged and bonded together.

8. A fluid line sound and vibration absorbing device for interconnecting rigid conduits comprising a first conduit, a second conduit spaced from said first conduit, a first outwardly disposed shoulder member secured to the first conduit at a point spaced from the free end thereof, a second outwardly disposed shoulder secured to the second conduit at a point spaced from the free end thereof, a cylindrical element secured at one end to the second shoulder around the conduits and overlying the first shoulder, a centrally bored end wall secured to the free end of the cylindrical element and disposed around the first conduit and a fluid tight flexible element formed of a plurality of washer shaped elements of materials having alternately different characteristic impedances secured at one end to the first shoulder and at its other end to the end wall, disposed about the first conduit and spaced from the cylindrical element and second shoulder to provide, with said first and second shoulder end wall and cylindrical member, a resonant chamber between the two conduits.

9. A device according to claim 8 in which the flexible element comprises a series of metal discs welded together at their inner peripheries and a series of ring-like elastomer elements disposed between adjacent discs and bonded thereto around their outer peripheries.

10. A device according to claim 8 in which the flexible element comprises a series of cells formed of washer-shaped elastomer member having one flat side and one recessed side joined together to form an assembly having an air chamber between adjacent elastomer members.

11. A device according to claim 8 in which the flexible element comprises a series of cells formed of washer-shaped elastomer members having a substantially I shaped cross-section joined together to form an assembly having an air chamber between adjacent elastomer members.

12. A device according to claim 8 in which the flexible element comprises a series of cells formed of washer-shaped elastomer members having one flat side and one recessed side, pairs of metal washer-shaped members conforming in curvature to the recesses in the elastomer members, said metal members being welded at their inner and outer peripheries and disposed between the elastomer members, the whole being joined together to form an assembly having an air chamber between adjacent elastomer members.

13. A device according to claim 8 in which the flexible element comprises ta plurality of washer-shaped metal discs welded together at their inner peripheries to form a series of fluid retaining chambers and a washer-shaped elastomer overlying a portion of the discs and bonded therebetween.

14. A device according to claim 8 in which the flexible element comprises a plurality of washer-shaped metal discs welded together at their inner peripheries to form a series of fluid retaining chambers, a quantity of fluid in each of said chambers, and a washer-shaped elastomer overlying a portion of the discs and bonded therebetween.

15. A device according to claim 8 in which the flexible element comprises a series of metal discs, a first series of ring-like elastomer members alternately bonded to the inner and outer peripheries of the discs to form a fluid tight bellows and a second series of ring-shaped elastomers bonded on one side to one of the adjacent discs to form with said first rings a fluid retaining compartment between adjacent discs.

16. A fluid line sound and vibration absorbing device for interconnecting rigid conduits comprising a first conduit, a second conduit spaced from said first conduit, a first outwardly disposed shoulder member secured to the first conduit, a second outwardly disposed shoulder secured to the second conduit, a cylindrical element overlying the first and second shoulders and the conduits, a centrally bored end wall secured to each end of the cylindrical element and disposed around the first and second conduits and a fluid tight flexible element formed of a plurality of washer-shaped elements of materials having alternately different characteristic impedances secured between the first shoulder and the end wall adjacent thereto and the second shoulder and the end wall adjacent thereto.

17. A fluid line sound and vibration absorbing device for interconnecting rigid conduits comprising a first conduit, a second conduit spaced from said first conduit, a first outwardly disposed shoulder member secured to the first conduit, a second outwardly disposed shoulder secured to the second conduit, a cylindrical element overlying the first and second shoulders and the conduits, a centrally bored end wall secured to each end of the cylindrical element and disposed around the first and second conduits, a first fluid tight flexible element formed of a plurality of washer-shaped elements of materials having alternately different characteristic impedances secured between the first and second shoulders and a second fluid tight flexible element formed of a plurality of washer-shaped elements of materials having alternately different characteristic impedances secured between the first shoulder and the end wall adjacent thereto and the second shoulder and the end wall adjacent thereto.

18. A fluid line sound and vibration absorbing device for interconnecting rigid conduits comprising a first conduit, a second conduit spaced from said first conduit, a first outwardly disposed shoulder member secured to the first conduit, a second outwardly disposed shoulder secured to the second conduit, a cylindrical element overlying the first and second shoulders and the conduits, a centrally bored end wall secured to each end of the cylindrical element and disposed around the first and second conduits, a first fluid tight flexible element formed of a plurality of washer-shaped elements of materials having alternately different characteristic impedances secured between the first and second shoulders, an elastomer tube connected at each end to the first and second conduit to form a fluid path therebetween and a second fluid tight flexible element formed of a plurality of washer shaped elements of materials having alternately different characteristic impedances secured between the first shoulder and the end wall adjacent thereto and the second shoulder and the end wall adjacent thereto.

19. A device according to claim 18 in which the first flexible element is formed of elements having more than one outside diameter.

20. A fluid line sound and vibration absorbing device for interconnecting rigid conduits comprising a first conduit, a second conduit spaced from said first conduit, a first outwardly disposed shoulder member secured to the first conduit, a second outwardly disposed shoulder secured to the second conduit, a cylindrical element overlying the first and second shoulders and the conduits, an opening in the cylindrical element, a pipe attached to said opening, a pressure regulator connected to the opening by the pipe, a temperature regulator connected between the first conduit and the pipe, a centrally bored end wall secured to each end of the cylindrical element and disposed around the first and second conduits, a first fluid tight flexible element formed of a plurality of washer-shaped elements of materials having alternately different characteristic impedances secured between the first and second shoulders and a second fluid tight flexible element formed of a plurality of washer-shaped elements of materials having alternately different characteristic impedances secured between the first shoulder and the end wall adjacent thereto and the second shoulder and the end wall adjacent thereto.

References Cited in the file of this patent

UNITED STATES PATENTS

| | | |
|---|---|---|
| 2,136,770 | Witzenmann | Nov. 15, 1938 |
| 2,184,482 | Austin et al. | Dec. 26, 1939 |
| 2,185,023 | Crane | Dec. 26, 1939 |
| 2,341,556 | Joy | Feb. 15, 1944 |
| 2,682,893 | Ziebold | July 6, 1954 |
| 2,847,035 | Peters | Aug. 12, 1958 |
| 2,916,052 | Peters | Dec. 8, 1959 |

FOREIGN PATENTS

| | | |
|---|---|---|
| 913,003 | France | May 20, 1946 |
| 967,589 | France | Mar. 29, 1950 |